United States Patent [19]
Mernyk

[11] 3,744,783
[45] July 10, 1973

[54] FRICTIONLESS SPRING SUSPENSION SYSTEM

[76] Inventor: Edwin H. Mernyk, 22 Stephens Drive, East Brunswick, N.J.

[22] Filed: Oct. 28, 1970

[21] Appl. No.: 84,670

[52] U.S. Cl. .............................................. 267/136
[51] Int. Cl. ........................................... F16f 15/02
[58] Field of Search .................. 267/136, 137, 150, 267/160, 182

[56] References Cited
UNITED STATES PATENTS

| | | | |
|---|---|---|---|
| 2,883,176 | 4/1959 | Bernstein | 267/160 |
| 3,465,997 | 9/1969 | Piske | 267/160 |
| 3,445,080 | 5/1969 | Flannelly | 267/136 |

Primary Examiner—James B. Marbert
Attorney—Samuel C. Yeaton

[57] ABSTRACT

A frictionless spring suspension system particularly suited for accelerometric devices in which an indicating displacement is restrained to be in a direction parallel to a measuring axis, and independent of forces operating in a direction transverse to that axis.

8 Claims, 11 Drawing Figures

PATENTED JUL 10 1973 3,744,783
SHEET 1 OF 2
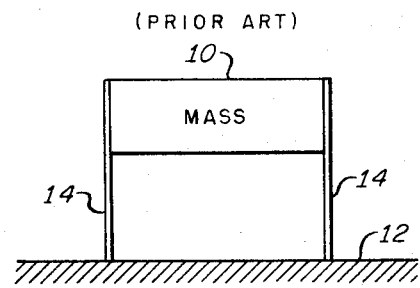
F I G. 1a.
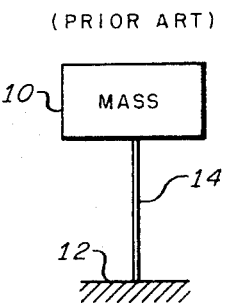
F I G. 2a.
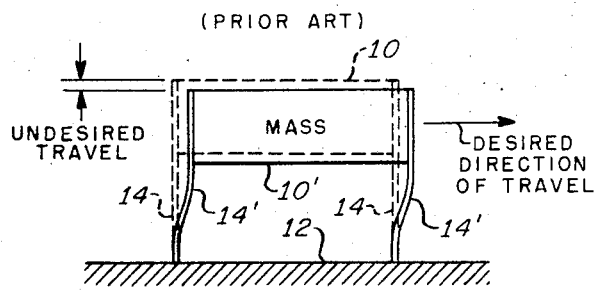
F I G. 1b.
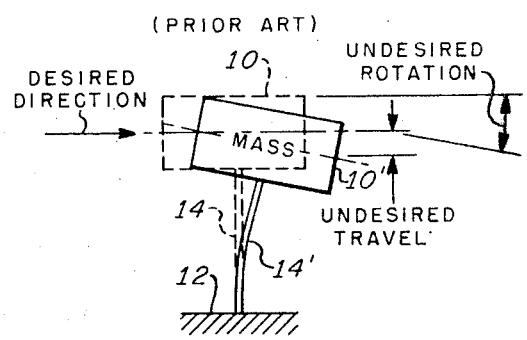
F I G. 2b.
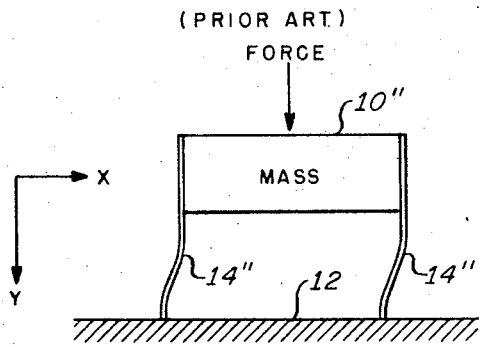
F I G. 1c.
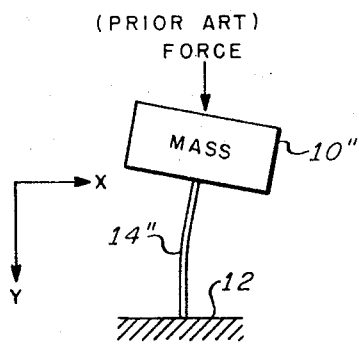
F I G. 2c.
INVENTOR.
EDWIN H. MERNYK
BY
*H P Terry*
ATTORNEY

PATENTED JUL 10 1973 3,744,783

INVENTOR.
EDWIN H. MERNYK

BY
*HP Ferry*
ATTORNEY

FRICTIONLESS SPRING SUSPENSION SYSTEM

BACKGROUND OF THE INVENTION

This invention relates to frictionless spring suspension systems, in general, and to such systems for use in accelerometric devices, in particular.

As is well known, such accelerometric devices are employed not only to provide measurements of acceleration, but also, after undergoing a series of integrating operations, to provide measurements of distance. A striking example of the usage of such devices is in long range nuclear submarines which remain submerged for weeks and even months before resurfacing. Since ships of this type are constantly undergoing acceleration and deceleration, it becomes imperative for the ship's captain to know precisely the whereabouts of his ship's location. Accelerometric devices are oftentimes employed to provide just such an indication.

It will be obvious that in such an environment, the accelerometric device — in order to provide the accurate indication required — must be able to discriminate against various motions on its operating mechanisms resulting from forces other than those resulting from accelerations or decelerations in a desired direction. It is also obvious that those parts of the device which sense an acceleration or deceleration must be restrained in their operation to one degree of motion. Otherwise, any indication provided will have built in to it some error which at times can be pronounced.

It is an object of the present invention, therefore, to provide a spring suspension system in which an inertia mass is restrained to one degree of freedom.

It is another object of the invention to provide such a suspension system in which the inertia mass is supported in a frictionless manner.

It is a further object of the present invention to provide a suspension system in which the moving inertia mass is responsive only to forces acting along the direction of desired travel.

It is an additional object of the invention to provide such a frictionless spring suspension system in which a predictable spring restraint to the moving mass can be imparted.

As will become clear hereinafter, a frictionless spring suspension system embodying the invention includes a moving inertia mass, together with a separator mass. The two units are secured to each other by two or more leaf springs or similar such restraints, with the separator mass being further secured by such restraints to the moving frame of an accelerometric device, for example. Any deflection of the moving inertia mass with respect to the separator mass in a direction other than that along the desired direction of travel will be balanced by an equal and opposite deflection of the separator mass with respect to the moving frame.

By employing leaf springs, or other arrangements of specified characteristics, the deflection imparted to the inertia mass with respect to the separator mass due to forces acting transverse to a measuring axis can be made to equal and oppose the deflection due to such forces between the separator mass and the moving frame. For example: the thicknesses of all leaf springs employed would be made the same; the working length of all leaf springs would be equal; and the moldulus of elasticity of all springs used would be the same. With these characteristics established, as well as preselecting the widths of the various leaf springs to be in a defined relationship, the resulting deflection of the inertia mass with respect to the moving frame of the device will only be in a desired direction of travel and in one degree of freedom.

BRIEF DESCRIPTION OF THE DRAWINGS

These and other objects of the present invention will become apparent when reading the accompanying description in conjunction with the figures of the drawings in which:

FIGS. 1a–1c show a first form of spring suspension system known in the prior art;

FIGS. 2a–2c show a second such prior art configuration;

DESCRIPTION OF THE PREFERRED EMBODIMENT

PRIOR ART SPRING SUSPENSION SYSTEMS

Figure 3A:
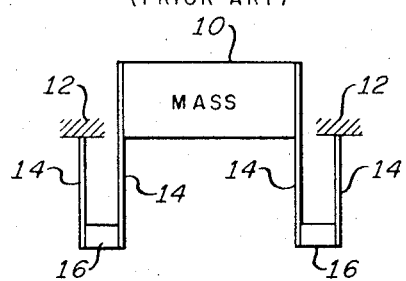
FIGS. 3a and 3b show a third prior art spring suspension system.

Referring now to FIGS. 1–3, the spring suspension systems there illustrated are prior art arrangements which have been used in accelerometric devices and have proved to be noticeably deficient in providing accurate indications of displacement resulting from external forces. Each suspension system includes an inertia mass 10 secured to a moving frame 12 by one or more leaf springs, or similar such arrangements, 14. The positon taken by the mass 10 with respect to the frame 12 when the accelerometric device in which the suspension system is included is at rest or undergoing constant velocity, is shown in *a* of each of these three drawings. In FIG. 3, the units 16 represent a spacing or separator block of conventional usage.

When the moving frame 12 and the device in which it is a part undergoes an acceleration or deceleration, the response of the mass 10 is delayed or advanced with respect to the frame, respectively. For example, if the reference frame 12 undergoes a sudden acceleration to the right as shown in the drawings, the mass 10 will fall behind its comparable frame position due to its inherent delay in responding. Similarly, if the moving frame undergoes a certain deceleration in its movement towards the right, the mass 10 will continue to move in that direction, also due to its delay in responding. FIGS. 1b and 2b indicate this last point, wherein it will be seen that the mass 10 continues to move in the right-hand direction at the velocity at which the accelerometric device was moving prior to the sudden deceleration. This is illustrated by the solid lines in those figures, as contrasted with the dotted lines which show the configuration at constant velocity or rest. Similar reference numerals with prime notations represent the new positions of corresponding elements under this decelerative force.

It will be noted from FIGS. 1b and 2b, however, that besides being displaced in a direction of travel (assumed to be from left to right — the driection of the measuring axis), the mass 10 also undergoes an undesired displacement in a direction transverse to the direction of travel. This results from the bending of the one or more leaf springs 14 resulting from the force due to the sudden deceleration. As has been experienced with many accelerometric devices, this undesired travel causes, in some respects, an erroneous indication of deceleration — and, in those instances where deceleration is converted to an indication of distance, an erroneous indication of such travel. Similar errors have been noted where the moving frame 12 undergoes an acceleration, instead of a deceleration.

It will also be noted from FIG. 2b that beside undersirably traveling in a direction transverse to the direction of travel, the spring suspension system undergoes a rotational displacement. This, too, has been found undersirable in that the resulting indication of acceleration and/or distance becomes inaccurate.

Figure 3B:
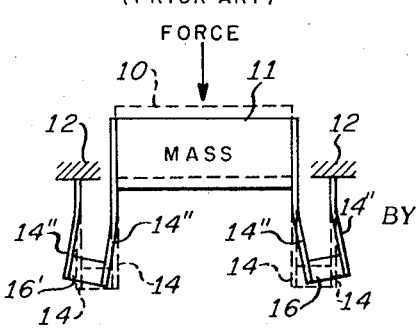

Also, in many of the environments in which the spring suspension system is to operate, there exists forces other than those resulting from an acceleration or deceleration along a desired direction of travel. For example, a loading or gravitational force, may be present to further affect the displacement due to that change in velocity. As shown in FIGS. 1c, 2c and 3b, the effect of this force in a direction transverse to the desired direction of travel causes undesired displacements in both the horizontal ($x$) and vertical ($y$) directions. In FIG. 3b this is indicated by the solid line portion, the dotted line portion indicating the position of the mass 10, frame 12 and leaf springs 14 at rest or at constant velocity. Here, also, an erroneous indication of acceleration or deceleration and/or distance will result due to the displacement of the mass resulting from forces acting other than in the direction of desired travel. The double prime notation in these drawings indicate the positions of corresponding elements resulting from such transverse forces.

DESCRIPTION AND OPERATION OF THE FRICTIONLESS SPRING SUSPENSION SYSTEM OF THE PRESENT INVENTION

Figure 4:
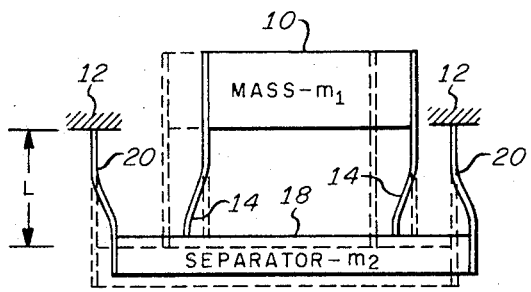
FIG. 4 illustrates a frictionless spring suspension system embodying the present invention.

Referring now to FIG. 4, the frictionless spring suspension system embodying the present invention includes an inertia mass 10 and a moving frame 12 providing a reference support therefor, as in the prior art configurations, but differing therefrom in that the leaf springs or other arrangements which previously connected them is differently structured. To be more specific, a separator mass 18 is shown and is secured to the mass 10 by a pair of those leaf springs 14. In addition, the separator mass 18 is secured to the moving frame 12 by another pair of leaf springs 20. The configuration of the spring suspension system at a rest or constant velocity is illustrated by the dotted line portions of this figure, while the solid line portions indicate the respective positions of the elemental parts when the moving frame 12 undergoes a deceleration force in moving from left to right in the drawing.

Whereas in the prior art arrangements of FIGS. 1b and 2b, the inertia mass undesirably deflected when such acceleration or deceleration was present, it will be seen that the deflection of the inertia mass 10 with respect to the separator mass 18 in the undesired (i.e., vertical) direction of the arrangement of FIG. 4 is offset by an opposite deflection of the separator mass 18 with respect to the moving frame 12. This offset is in a direction to reduce the undesired travel of the type shown in FIGS. 1b and 2b with respect to the support frame 12 and to offset the undesired displacements resulting from transverse forces of the type described with respect to FIGS. 1c, 2c and 3b. Thus, a more accurate indication of moving mass displacement resulting from an acceleration or deceleration force can be obtained.

In particular, it will be seen that the inertia mass 10 and separator mass 18 are spatially positioned with respect to one another so as to be subject to changing forces within the frictionless spring suspension system in substantially the same manner. The leaf springs 14 intercouple the shorter inertia mass to the longer separator mass at positions approximately one-quarter of the way from the respective ends of the separator mass 18. The leaf springs 20 in this respect serve to intercouple the respective ends of the separator mass 18 to the moving frame reference supports 12, which undergo a relative movement under the action of acceleration or deceleration forces. These supports effectively limit the displacement of the separator mass 18 produced in response to any acceleration or deceleration forces. The arrangement of the reference supports on the moving frame 12 and the leaf spring arrangements 14 and 20 are such that the springs 14 and 20 deflect in opposite directions in response to a changing force having a component operating in a direction parallel to the movement of the frame 12. Similarly, these leaf springs 14 and 20 also deflect in opposite directions when the changing force is one having a component which operates in a direction transverse to the relative movement of the frame 12. In both these respects, the opposite deflections serve to reduce any of the undesired travel of the moving mass 10 previously encountered in prior art arrangements due to the presence of a force acting in the direction of desired travel (FIGS. 1b, 2b) or to a force acting transverse to that direction (FIGS. 1c, 2c, 3b).

In order to provide an accurate indication of displacement resulting from acceleration or deceleration forces acting in the direction of desired travel, it will be apparent that the offsetting deflections in FIG. 4 should be equal. It can be shown that these deflections between the inertia mass 10 and the separator mass 18, on the one hand, will equal that between the separator mass 18 and the moving frame 12, on the other hand, when the following conditions are met:

1. When the thicknesses of the leaf springs 20 are the same as the thicknesses of the leaf springs 14;

2. When the width of the leaf springs 20 are equal to $(m_1 + m_2)/m_1$ times the width of the leaf springs 14, where $m_1$ and $m_2$ equal the respective masses of the units 10 and 18;

3. When the working length L of the leaf springs 20 and the corresponding length of the leaf springs 14 are the same; and 4. When the modulus of elasticity of the leaf springs 20 are equal to that of the leaf springs 14.

Alternate embodiments of the present invention, though not shown, will be readily apparent. Thus, whereas the frictionless spring suspension system of FIG. 4 employs a single separator mass 18 and types of leaf springs 20 similar to the leaf springs 14 used in conjunction with the inertia mass 10, different numbers of separator masses may be employed and different types of springs may be utilized throughout. However, the concept of offsetting the deflection of the inertia mass 10 with respect to the separator mass 18 by an equal displacement between the separator mass and a frame will be common throughout.

Figure 5:
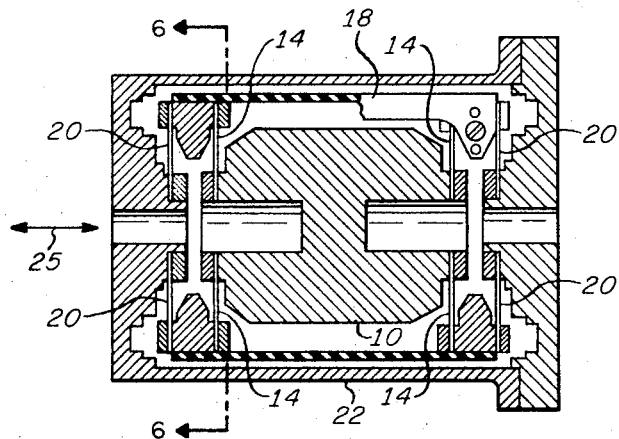
FIGS. 5 and 6 are cross-sectional cutaway views of an accelerometric device employing the frictionless spring suspension system of FIG. 4.
Figure 6:
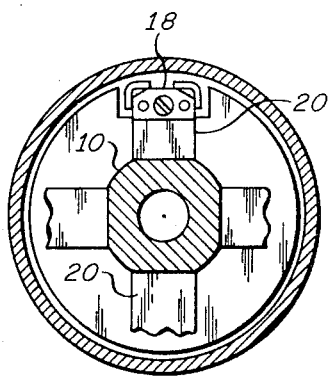

Referring now to FIGS. 5 and 6, the cutaway portion of a pneumatic accelerometer device there shown includes a frictionless spring suspension system according to the above described arrangement. In the actual design illustrated, the moving mass 10 is actually supported by four separator systems of the type described with respect to FIG. 4. The moving mass 10 is, as shown, included within housing 22, which corresponds to the moving frame 12 of the preceding drawings. Those elements of FIGS. 5 and 6 performing similar functions to corresponding elements of the above-described drawings bear similar reference notations. As in the preceding illustrations, the desired direction of travel which is subject ot either acceleration or deceleration forces is in the left to right direction as indicated by the arrow 25 in FIG. 5. FIG. 6, in this respect, represents a view of the device of FIG. 5 taken along the section line 6—6.

It will readily be seen from FIGS. 4-6 that the frictionless spring suspension system of the invention is one in which the mass 10 is restrained to a single degree of freedom, namely horizontal movement as shown in the drawing. Existing forces acting in a direction transverse to that of desired travel do not affect the degree of freedom in which the inertia mass can move, due to the offsetting actions of the leaf springs connecting the inertia mass to the separator mass in one case, and the separator mass to the moving frame or housing, in the second instance. Predictable spring restraints can be established in the environment, if desired, merely by setting forth prescribed relationships between the width, modulus of elasticity, thickness, and working length as set forth hereinabove. Lastly, it will be noted that the suspension system of these drawings are ones which do not require any lubrication and which provide frictionless support.

I claim:

1. A frictionless spring suspension system comprising:
   first and second masses spatially positioned with respect to one another to be subject to changing forces within said system in substantially the same manner,
   first spring means intercoupling said first and second masses,
   support means equally subject to said changing system forces for undergoing a relative movement from an initial rest position, and
   second spring means intercoupling said reference support means and said second mass for limiting the displacement of said second mass produced in response to said changing system forces,
   said reference support means and said first and second spring means being so arranged that displacement of said first mass in response to said changing forces is substantially only along the same direction as the relative movement of said reference supports means due to the presence of said forces.

2. A frictionless spring suspension system as defined in claim 1, wherein said first and second spring means each include a pair of leaf springs which deflect in opposite directions in response to changing forces having a component operating in a direction transverse to the relative movement of said reference support means.

3. A frictionless spring suspension system as defined in claim 1, wherein said first and second spring means each include a pair of leaf springs which deflect in opposite directions in response to changing forces having a component operating in a direction parallel to the relative movement of said reference support means.

4. A frictionless spring suspension system as defined in claim 1, wherein the longer dimension of said second mass exceeds the longer dimension of said first mass, wherein said first spring means intercoupling said second mass does so at a position intermediate the positions from which said second spring means originates to intercouple said reference support means.

5. A frictionless spring suspension system as defined in claim 1 for use in an accelerometric device wherein said first mass represents the inertia mass of said device and wherein said second mass represents a separator mass of said device.

6. A frictionless spring suspension system as defined in claim 1, wherein said first and second spring means each include a pair of leaf springs, and wherein one of said pairs of leaf springs has at least one of its thickness, length and modulus of elasticity equal to that of the other of said pairs.

7. A frictionless spring suspension system as defined in claim 6, wherein the width of said pair of leaf springs included within said second spring means substantially equals $m_1 + m_2/m_1$ times the width of said pair of leaf springs included within said first spring means, where $m_1$ and $m_2$ represent the values of the mass of said first and second masses, respectively.

8. A frictionless spring suspension system comprising:
   first and second masses spatially positioned with respect to one another to be subject to changing forces within said system in substantially the same manner;
   first spring means intercoupling said first and second masses;
   reference support means;
   second spring means intercoupling said reference supports means and said second mass for limiting the displacement of said second mass produced in response to said changing system forces;
   said reference support means and said first and second spring means being so arranged as to prevent displacement of said first mass in response to said changing forces in a direction substantially transverse to the spatial alignment of said reference support means.

* * * * *